United States Patent
Cresap, Jr.

(10) Patent No.: US 7,887,762 B1
(45) Date of Patent: Feb. 15, 2011

(54) PULSED OZONE SPARGING FOR INJECTING A HIGH VOLUME HIGH-CONCENTRATION OF OZONE

(76) Inventor: Gerald H. Cresap, Jr., 8 Woodlawn Ave., Wellesley, MA (US) 02481

( * ) Notice: Subject to any disclaimer, the term of this patent is extended or adjusted under 35 U.S.C. 154(b) by 1055 days.

(21) Appl. No.: 11/699,136

(22) Filed: Jan. 27, 2007

(51) Int. Cl.
*B01J 19/08* (2006.01)

(52) U.S. Cl. ............... 422/186.07; 210/747; 210/760; 210/170.07; 405/128.45; 405/128.5

(58) Field of Classification Search ............ 422/186.07; 210/747, 760, 170.07; 405/128.45, 128.5
See application file for complete search history.

(56) References Cited

U.S. PATENT DOCUMENTS

2003/0173276 A1* 9/2003 Arnaud .................. 210/143
2005/0067356 A1   3/2005 Bowman et al.

* cited by examiner

Primary Examiner—Alexa D Neckel
Assistant Examiner—Xiuyu Tai
(74) Attorney, Agent, or Firm—Robert Nathans

(57) ABSTRACT

An ozone gas source supplies a high pressure ozone gas mixture of an oxygen carrier gas having a high ozone gas concentration of 5-14% of ozone gas to a pulse storage tank. A programmable controller causes a valve means to open and transport the ozone gas mixture within the high pressure pulse storage tank into an injection point when pressure of the ozone gas mixture in the high-pressure pulse storage tank reaches a high discharge pressure site-specific set-point, and causes the valve means to close when pressure within the high pressure pulse storage tank drops and approaches a low pressure site-specific set-point. This process is repeated for injection of a gas pulse into second and subsequent injection points. The high concentration of ozone dissolves a high percentage of ozone into groundwater, producing enhanced oxidation of contaminants and the high gas pressure forces ozone into smaller pores, enhancing contact with contaminants.

20 Claims, 1 Drawing Sheet

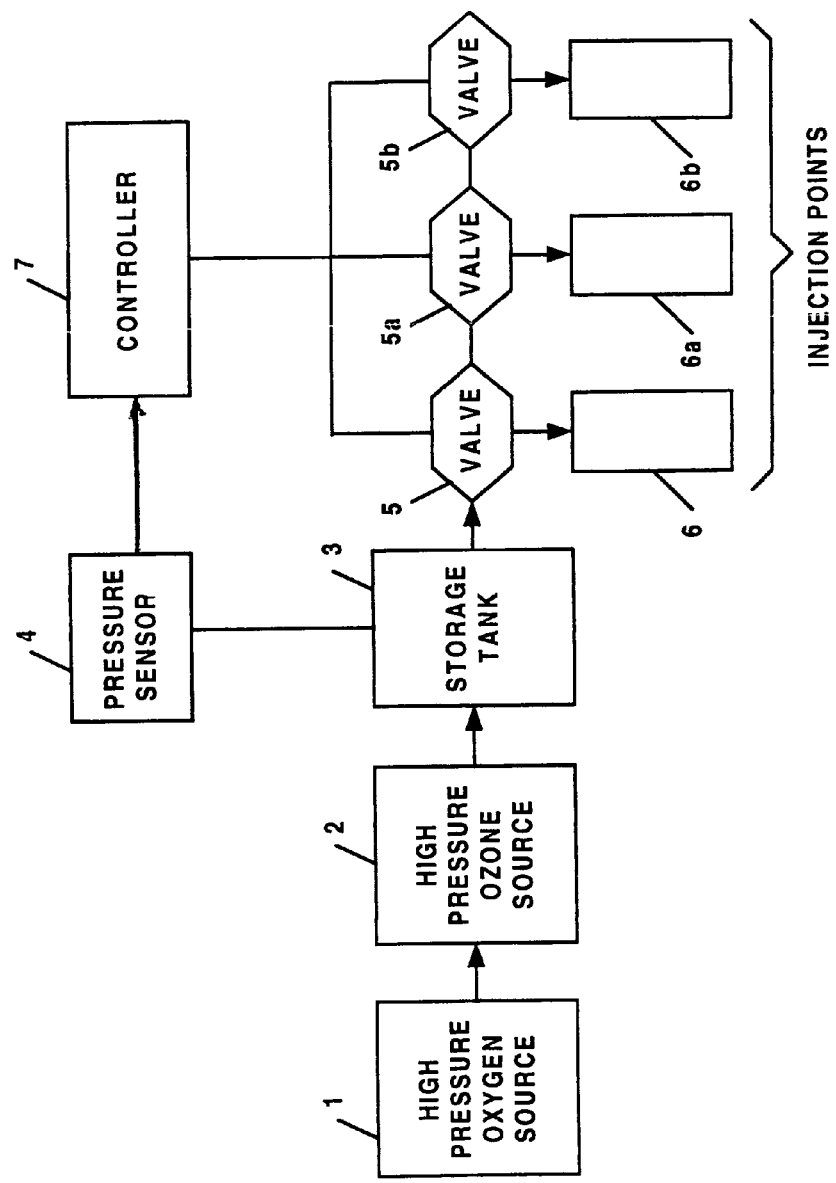

PULSED OZONE SPARGING FOR INJECTING A HIGH VOLUME HIGH-CONCENTRATION OF OZONE

BACKGROUND OF THE INVENTION

The improper handling and disposal of hazardous wastes has resulted in thousands of contaminated sites in the United States and throughout the world. Groundwater and soils contaminated with organic compounds, such as solvents, are often difficult to remediate. Methods for the cleanup of these sites have evolved over the past 25 years; the first approaches focused on excavation of source areas and the pump-and-treat cleanup of groundwater. The depth and areal distribution of contaminants often precludes any attempts at excavation while the effectiveness of groundwater extraction is limited by the low solubility of these contaminants, the weakness of dispersive mixing processes, and kinetic limitations on the rates of mass transfer from the non-aqueous phase into the dissolved phase. Recently, in-situ chemical oxidation (ISCO) using oxidizers such as permanganate, hydrogen peroxide, or ozone have been deployed to aggressively remove contaminant mass and reduce the concentration of the target compounds below regulatory criteria.

In-situ chemical oxidation involves the introduction of a chemical oxidant into the subsurface to transform contaminants into species that are harmless or non-objectionable by treating them in-situ, or in place. Chemical oxidation is a process in which the oxidation state of a substance is increased and the oxidant is reduced by accepting electrons released from the transformation (oxidation) of target and non-target reactive species. For example, oxidation of trichloroethylene (TCE) and perchloroethylene (PCE) with ozone may produce reaction byproducts that include dichloroacetaldehyde and dichloroacetic acid, compounds with lower toxicity. Oxidation of these byproducts to $CO_2$ and $H_2O$ could also be accomplished through continued reaction with ozone.

Injecting ozone gas into saturated soils, also known as ozone sparging, has been applied at many sites with various level of success. In conventional ozone sparging, ozone is produced on site and injected into one or more ozone injection or sparge wells. The injection wells are constructed of solid casing to a depth that corresponds to the soil and/or groundwater contamination. A well screen or a diffuser is installed at the bottom of the injection well to allow the ozone gas to move into the subsurface. The injected gas moves into the saturated soils and rise to the top of the groundwater. Contaminants that contact the ozone gas are either oxidized in the soluble phase or volatized and transferred to the gas phase where the chemical reacts with the ozone.

Because ozone is injected into the subsurface as a gas, mass transfer of the ozone from the gas phase into the water phase is required. The most common means of accomplishing ozone introduction are sparging into the aquifer, using designs similar to those successfully used with in situ air sparging, or injection of ozonated water into the aquifer. In-situ sparging is more commonly used because of the high oxidizer demands associated with most aquifer systems and the short half-life of ozone in water.

Ozone sparge points may be either vertical or horizontal wells that are screened within the saturated zone. Often numerous wells are operated as "clusters" using a cycling schedule. Depending on the soil permeability, ozone sparge rates can range from ¼-2 scfm for most applications.

The most common type of ozone generator used in ozone sparging applications is the corona discharge generator. This generator produces ozone by passing dry air or oxygen between two concentric metallic electrodes of opposite charge, resulting in the production of ozone. Air fed systems produce 1 to 2% (by weight) ozone gas. By using concentrated oxygen as the carrier gas for ozone production, ozone concentrations as high as 14% can be achieved. Ozone generator capacities are typically expressed in terms of mass output such as pounds of ozone per day (lb/day).

The area that the rising ozone gas treats is referred to as the radius of influence (ROI). This area is often described as being symmetrical and circular, but it is rarely uniform due to subsurface heterogeneities. For this reason, the term zone of influence (ZOI) is used because it more accurately describes the processes occurring in the subsurface. The ZOI for ozone sparging is a dynamic parameter because of the highly reactive nature of ozone. As ozone moves through the subsurface, it reacts with organic matter, calcium carbonate, metals, and other constituents, thereby reducing the concentration. As more ozone is injected into the subsurface, the compounds that react with the ozone are depleted, thereby allowing the ozone to travel farther from the injection point. Eventually, the ZOI for ozone sparging may approach the ZOI of a conventional air sparge well. However, due to the highly reactive nature of ozone and its limited half-life in water (approximately 30 minutes in clean water), it is typical to encounter a ZOI for ozone that is ⅓ to ⅔ that for a conventional air sparge well.

The distance that a sparged gas moves from the injection well is a function of the depth below the water table the gas is injected, the injection pressure and the gas flow rate. Increasing the depth of gas injection is often used to increase the ZOI. However, this method of increasing the ZOI is often limited by geologic conditions (e.g. impermeable zones) and the fact that as ozone moves through saturated soils, it is depleted as it reacts with target and non-target compounds.

One of the most common limitations with ozone injection systems is the operating flow rate of the ozone generator. A typical 1 lb/day ozone generator using oxygen as the carrier gas operates at a flow rate of 5 to 20 liters per minute (LPM) which is too low to produce a ZOI greater than 3 to 5 feet. In order to overcome this limitation, compressed air is often added to the ozone gas to increase the injection flow rate, thereby expanding the ZOI. This practice also has the undesirable effect of reducing the ozone gas concentration which reduces the mass transfer efficiency. For a typical site, the reduction in ozone gas concentration is substantial—from 50,000 parts per million (ppm) to less than 1,000 ppm.

SUMMARY OF PREFERRED EMBODIMENTS OF THE INVENTION

The invention includes injecting high-concentration ozone gas into one or more ozone injection wells at a high volumetric flow rate. The term "Pulsed Ozone Sparging" is applied to this new process. High-concentration ozone gas is used to enhance the mass transfer, producing higher concentrations of dissolved ozone, thereby increasing the destruction of contaminants and more efficiently using the injected ozone. The ozone gas is injected into the subsurface at a high volumetric flow rate to increase the zone of influence and to force ozone gas into smaller pore spaces and less permeable regions than would be possible using low injection flow rates.

Pulsed ozone sparging of the invention involves injecting high-concentration ozone gas into saturated soils to chemically oxidize volatile organic compounds (VOCs), semi-volatile organic compounds (SVOCs), chlorinated solvents, petroleum hydrocarbons, and other organic compounds. A typical treatment system includes a compressed air supply, an oxygen concentrator, a corona discharge ozone generator, an ozone storage device, a manifold, and a control system. A series of ozone injection points are installed across a site throughout the area to be remediated. The ozone injection points are connected to the ozone pulse system via ozone compatible tubing or piping. Automatic solenoid valves may be used to cycle the injection of gas through the sparge wells and to automate the process. This may also be performed manually using valves. The necessary gas injection rate and pressure are determined for each site to ensure sufficient contact between ozone and the contaminants of concern is initiated.

Concentrated oxygen at high pressure is used as the carrier gas to produce ozone at a preferred concentration of 10 to 14% and pressures as high as 100 psig. The concentrated ozone is temporarily stored in a high-pressure pulse tank. The control system monitors the pressure in the tank as it is generated, and, when the ozone gas pressure reaches the site-specific set-point, opens an automatic valve allowing the ozone gas to be injected into the subsurface. The pressurized gas flows at a rapid rate, typically between 1 and 20 cubic foot per minute (CFM), until the pressure in the tank decreases to the minimum injection pressure of the sparge well. At this point, the control system closes the automatic valve and the ozone pulse tank is re-pressurized. When the high pressure set-point is reached again, the next automatic valve in the sequence opens, thereby allowing a pulse of concentrated ozone gas to be injected into the next injection well. This process continues for each of the ozone injection points, and then the cycle repeats again.

BRIEF DESCRIPTION OF THE DRAWING

The sole FIGURE schematically illustrates a preferred arrangement of elements of the invention.

DETAILED DESCRIPTION OF PREFERRED EMBODIMENTS OF THE INVENTION

The solubility of a gas in a liquid can be determined from Henry's Law. The maximum achievable equilibrium concentration of a gas in a fluid is given by:

$$C_{Liquid} = C_{gas} \beta_{(Temperature)} P_{Gas}$$

where:
$C_{Liquid}$=Dissolved concentration in liquid
$C_{gas}$=Gas concentration
$\beta_{(Temperature)}$=Bunsen coefficient (solubility), temperature dependent
$P_{Gas}$=Gas pressure From this equation it may be seen that increasing the ozone gas concentration produces a corresponding increase in the ozone solubility. For example, increasing the ozone gas concentration from 4% to 8%, while holding all other variables constant, would double the ozone solubility. Assuming a groundwater temperature of 10° C., the ozone concentration in water as a function of gas phase concentration is summarized in Table 1 and presented graphically in FIG. 1.

TABLE 1

| Ozone Gas Concentration vs. Solubility | |
|---|---|
| Gas Concentration | Water Concentration |
| 1,000 ppm | 0.58 mg/L |
| 1% | 5.8 mg/L |

TABLE 1-continued

| Ozone Gas Concentration vs. Solubility | |
|---|---|
| Gas Concentration | Water Concentration |
| 5% | 29 mg/L |
| 10% | 58 mg/L |

For a conventional ozone sparge system, the concentration of the ozone at the injection point is typically less than 1,000 ppm. If the dilute ozone gas is also pumped through a compressor to increase the pressure, the concentration can be reduced to 100 ppm. Increasing the concentration from 1,000 ppm to 10% will increase the corresponding ozone solubility by a factor of 100, or more.

Pressure Calculations

The minimum sparge injection pressure necessary to induce gas flow is a combination of the hydrostatic pressure, the frictional losses in the conveyance piping and well screen, and the gas-entry pressure of the well annulus packing material and the geologic formation. This pressure is given by:

$$P_{min} = P_{hydro} + P_{friction} + P_{packing} + P_{formation}$$

where,
$P_{min}$ is the minimum injection pressure necessary to induce flow,
$P_{hydro}$ is the hydrostatic head,
$P_{friction}$ is the frictional losses in the conveyance piping and well screen,
$P_{packing}$ is the gas-entry pressures for the well annulus packing material, and
$P_{formation}$ is the gas-entry pressures for the formation.

The pressure required to displace the column of water standing in the well pipe, known as the hydrostatic pressure, is defined as:

$$P_{hydro} = 0.43(z_s - z_w)$$

where,
0.43 is the conversion from feet of water to psig,
$z_s$ is the pre-sparging depth to water within the sparge well, and
$z_w$ is the depth to the top of the well screen.

The frictional pressure is a function of the gas velocity within the conveyance piping and the injection well. Typically, the pipe size is selected to minimize frictional losses in order to maximize the pressure available to induce gas flow into the formation. The gas-entry pressures of the packing material and the formation, which are determined by applying the capillary theory to the pore size of the largest pores adjacent to the filter pack, are defined by:

$$P = 2F/r = 4F/d$$

where,
P is the gas-entry pressure,
F is the surface tension of water in air, and
r is the radius and d the diameter of the constrictions along the largest pores of entry.

Gas-entry pressures are typically small compared to the hydrostatic pressure in most ozone sparging applications. For coarse sands and gravels, the gas-entry pressure is less than 1 foot $H_2O$, whereas the gas-entry pressure for silts may exceed 4 ft $H_2O$.

Prior to initiating ozone injection at a site, it is important to calculate the maximum allowable injection pressure to prevent pneumatic fracturing of the aquifer. The pressure at which fracturing can occur is given by:

$$P_{fracture} = 0.73D$$

where, $P_{fracture}$ is the pressure at which fracturing of the aquifer can occur At many ozone sparge sites, the injection pressure ranges from 15 pounds per square inch gauge (psig) to as high as 75 psig. Most ozone generators are designed for operating at either vacuum or at low pressures (less than 10 psig). This limitation requires the use of a pressure-boosting device such as an ozone-booster pump or a venturi. A booster pump is an ozone-compatible compressor that re-pumps the ozone gas to increase the pressure to the desired level. However, the high internal pressures and temperatures of most pumps destroy a significant amount of the ozone gas because ozone is unstable at high temperature and pressure and reverts back to oxygen. A venturi increases the ozone gas pressure by feeding a high-pressure compressed air stream into the venturi, which inducts the ozone gas into the air flow and discharges it at a higher pressure. The venturi does not generate heat, which prevents destruction of ozone gas. However, the compressed air has the effect of diluting the ozone gas and reducing the concentration of the gas that is injected into the subsurface. A typical venturi has an air to ozone ratio of 100:1. This dilution results in a decrease of the ozone gas concentration from 10% to 1,000 ppm or less.

As ozone gas enters the saturated zone, it moves through the pore spaces between soil particles. In order to initiate contact between ozone and the contaminants, it is necessary to force the ozone into the tighter material and smaller pore structure. However, a gas will flow preferentially through the coarse grained material. Injecting the ozone at a high volumetric flow rate forces the gas into the smaller voids. As the flow rate through the large pores associated with the coarser material increases, the resistance to flow also increases, until the gas-entry pressure of the more fine-grained soil is exceeded and ozone is forced into the smaller pores. For a given set of site conditions, it is important to have a thorough understanding of the soil conditions, the hydrogeology, and the contaminant distribution to ensure adequate contact between the injected ozone and the contaminants.

Prior to implementing ozone sparging at a hazardous waste site, sufficient data should be collected to create a defensible conceptual site model (CSM). The CSM generally includes a series of graphics such as cross sections and plan view maps showing the hydrogeologic setting, locations of key physical features, and the approximate extent of source zone and dissolved plume contamination. The site characterization data should be used to define the target treatment zone and to develop the conceptual model for ozone gas distribution at the site. Ideally, one or more continuous cores should be collected between the upper boundary of contamination and the top of the anticipated screened interval of the ozone injection points. Generally, the top of the injection screen is located 1 to 10 feet below the deepest contamination.

The sole FIGURE presents an ozone pulse injection system that includes an exemplary three ozone injection points. The sparging system includes a high-pressure oxygen source 1, a high-pressure ozone source 2, an ozone pulse storage tank 3, a pressure sensing device 4, valves 5, ozone injection points 6, and a programmable controller 7. These components are described in greater detail in the following sections.

A source of high-pressure oxygen gas is required to produce ozone at high concentrations. Oxygen can be provided from several sources, including liquid oxygen, high-pressure oxygen gas cylinders, and a pressure-swing adsorber (PSA) oxygen concentrator. If a PSA oxygen concentrator is utilized, it may be necessary to increase the oxygen pressure using an oxygen booster pump. Oxygen is typically supplied at a purity of 90% or more and at pressures ranging from 50 to 150 psig.

The process calls for a source of high-pressure ozone gas. The preferable source is a high-pressure corona discharge ozone generator which can produce ozone gas at pressures as high as 100 psig and at concentrations up to 14%. High pressure ozone is required to inject the gas into the subsurface at sufficient flow rates. High concentration ozone is preferred due to the greater dissolved ozone concentrations that can be realized as shown in Table 1. High-pressure ozone is produced using either 1) a high-pressure ozone generator (50 to 100 psig) or 2) a conventional ozone generator with an ozone booster pump. In method 2) the booster pump increases the ozone gas pressure from the output pressure of the ozone generator (typically 1 to 20 psig) to the desired higher ozone pressure (typically 50 to 100 psig).

Oxygen enters the ozone generator through process piping that is compatible with oxygen and the operating pressures. Various gauges, flow meters, flow control valves, and associated appurtenances may be utilized to monitor the operation and performance of the pulse system.

Although only one high-pressure ozone source 2 is shown in the sole FIGURE, multiple ozone sources may be used in the process. Additionally, although the FIGURE only shows one discharge port on the pulse tank, multiple discharge ports may be employed as part of the ozone pulse process.

Ozone gas is temporarily stored in a pressure-rated and ozone compatible tank until the desired discharge pressure is achieved. The size of the pulse storage tank 3 is determined based on the desired zone of influence and the minimum volume of gas necessary to produce the ZOI that can be compressed in the pulse tank with the maximum pressure available from the ozone generating system. Various tank volume and operating pressure combinations can be used to achieve the target ZOI. The final selection is often made based on the optimum balance between capital investment for larger tank sizes and operational limitations of the ozone generator.

A pressure sensor device 4 is used to monitor the pressure within the ozone pulse tank 3. This device may be a pressure switch, transducer, or other sensing device that provides a signal to the control system that the target pressure has been achieved in the pulse tank. Although only one pressure sensing device has been shown in the FIGURE, multiple pressure sensing devices and/or more than one type of pressure sensing device may be used. In addition, other sensors and devices may be installed on the pulse tank and the process piping to allow monitoring of the process.

Once the pressure within the ozone pulse tank has reached the desired level, an automatic valve 5 opens to inject the concentrated ozone gas from the into an ozone injection point injector 6. One automatic valve 5 is used for each ozone injection point. Although the FIGURE displays three automatic valves and injection points, the pulse injection process may be used with any number of valves and injection points. A preferred method of controlling the pulse injection is to use either an electric or pneumatic solenoid valve. However, other types of valves and flow controlling devices may be used. Another variation is to use one automatic valve for several injection points with manual valves to control which injection points receive ozone gas.

Ozone gas is injected into the contaminated groundwater through a network of ozone injection points. Other terms that are also used to describe the ozone injection points include ozone injection wells, ozone sparge wells, and ozone sparge points. An ozone injection point consists of a solid riser or casing that extends from the ground surface to a point beneath the deepest depth of groundwater contamination. A length of slotted screen or a diffuser is connected to the solid casing to allow the ozone gas to exit the injection point and enter the saturated zone. The riser and screen assembly may be installed using conventional drilling methods and constructing the well within the borehole. For a typical ozone injection well, the annular space between the slotted screen is filled with well sand or gravel to an elevation approximately one foot above the top of the screen. A seal, such as bentonite or other suitable material, is placed above the well sand to prevent the ozone gas from rising up within the borehole and to force the ozone out of the borehole and into the formation. The remainder of the annular space above the seal is typically sealed with a concrete/bentonite grout or other suitable material. Other methods of installing ozone injection points include direct push or vibratory methods in which the solid riser and screened section are pushed into the proper elevation and position.

A programmable controller 7 is used to monitor the pressure within the ozone pulse tank and to open and close the automatic valves as required. This controller may be a programmable logic controller (PLC), a personal computer, a relay control system, or other appropriate controller.

The optimum ozone pulse tank operating pressures are unique to each site. The low and high pressure set-points are a function of the minimum gas injection pressure, the desired zone of influence, and the maximum ozone gas pressure that can be produced with the available equipment. The low pressure set-point is typically set to a value that is 20% greater than the minimum calculated gas injection pressure for the injection point with the highest pressure requirement. This 20% factor of safety provides the driving force necessary to ensure that the tank empties before the available tank pressure falls to the minimum gas injection pressure. The high pressure set-point is typically set to a value that is two to three times the low pressure set-point. The upper limit of the high pressure set-point is the maximum pressure that can be produced by the ozone generator or booster pump being used. This upper pressure limit is generally considered to be 100 psig, although higher pressures are possible. The ozone pulse tank volume is selected based on the volume of ozone that must be injected with each pulse to achieve the desired zone of influence and the high pressure set-point.

During the start-up process, the low and high pressure set point values are verified to ensure that the ozone injection process is operating optimally. The most typical ozone pulse tank pressure settings are 20 to 30 psig for the low pressure set-point and 40 to 60 psig for the high pressure set-point. However, at sites with less permeable soil conditions or in cases where the ozone injection points are screened at depths significantly below the water table, the low and high pressure set-points may be as high as 50 and 100 psig, respectively. Similarly, at sites with more permeable soil conditions, it is generally beneficial to reduce the pressure set-points in order to increase the ozone production rate due to inefficiencies associated with operation at higher pressures.

The Benefits of Pulsed Ozone Sparging

The higher concentration of injected ozone gas increases the mass transfer efficiency and destroys more contaminants with the same mass of ozone. The high concentration of ozone gas (5 to 14%) increases the solubility of ozone in water compared to conventional ozone sparging; see table 1. This has the benefit of dissolving a greater percentage of the ozone into the water for direct oxidation of dissolved phase constituents. The net effect is an increase in the overall efficiency of the in-situ chemical oxidation process and greater contaminant destruction.

The high volumetric flow rate used in the ozone pulse process forces ozone into smaller pore spaces, enhancing the contact between ozone and the contaminants of concern. Since ozone sparging is highly dependent on contact of the injected ozone with the target contaminant, the presence of soil heterogeneities will impact the effectiveness of the technology. In situations where the heterogeneities prevent effective contact with the contaminants, the success of ozone sparging may be limited by the mass transport of contaminants from the non-contacted soil matrix to the adjacent ZOI. In such cases, ozone sparging would require extensive treatment times, and, following system shut-down, a rebound in groundwater concentrations is likely. The high flow rate of the ozone pulse process exceeds the capacity of the large pore network to accept flow, thereby creating higher pressures in the subsurface. As the gas-entry pressure of the smallest pore network containing contaminants is achieved, the ozone gas is forced into the smaller pores, allowing contact between the injected ozone and contaminants present within the finer grained soil matrix.

The ozone pulse process creates enhanced mixing which produces greater contact between ozone and the contaminants of concern. Injected ozone gas moves continuously through porous aquifers following preferential pathways or channels. As the pulsed gas initially moves into the saturated zone from the injection well, groundwater in the vicinity of the well is displaced. This displaced water moves horizontally and vertically from the injection well, creating a mounding effect in the vicinity of the well. When the pulse is terminated, the hydrostatic pressure imbalance causes water to flow back into the channels that had been filled with ozone gas. The net effect is a continuous cycle in which the water column is expanded, collapses, and is allowed to equilibrate for a period of time. This cycle creates a mechanical mixing between ground water and injected ozone. Mixing enhances contact between the oxidizer and the contaminants of concern, thereby increasing the overall efficiency of the process.

Soil vapor extraction is not required with the ozone pulse process. A typical ozone sparging system is often operated concurrently with a SVE system because the volume of injected gas can potentially displace and mobilize contaminant vapors in the subsurface. In order to capture and contain these mobilized vapors, a vacuum is applied to a series of vapor extraction wells to remove the contaminants. The ozone pulse system of the present invention, in comparison, injects a fixed-volume of ozone in one short duration pulse. The total volume of injected gas for the ozone pulse system is substantially less than that for conventional air- and ozone-sparging—typically 5% of the total volume. As a result, the potential for the ozone pulse system to mobilize contaminant vapors is substantially lower. Therefore, soil vapor extraction will often not be necessary when the ozone pulse system of the invention is utilized.

The high volumetric flow rate used in the ozone pulse system overcomes limitations associated with conventional ozone sparging due to site heterogeneities.

The injected ozone gas flows through discrete gas channels in most settings and contaminant oxidation from water-saturated regions lying outside the gas channels is limited by liquid-phase mass transfer processes. Thus, contaminant destruction is most rapid from within the gas channels and slowest from outside the gas channels. Furthermore, gas channels occupy at most 20 to 50% of the pore space, so typically most of the contaminant mass lies outside of these channels. In order to maximize the efficiency of ozone sparging and reduce the total time required to achieve the cleanup standards, it is critical to maximize the percentage of the pore space filled with gas.

Regarding the benefits of higher flow rate of the invention, the most significant factors affecting air sparging performance are the air distribution in the target treatment zone and the distribution of contaminants relative to the air distribution. All other factors being equal, remediation is more effective in settings having a higher density of air channels in the treatment zone. The knowledge gained through the implementation of air sparging at thousands of sites, especially the mechanics of gas flow through saturated soils, can be applied to ozone sparging.

At most hazardous waste sites the soil matrix is not homogenous and a range of pore sizes is present in the subsurface. The initial ozone flow paths take place via the paths of least resistance, which is through the largest pores available. If the largest network of pores has the capacity to transmit all of the gas that is injected into the soil formation, then the pressure will not rise above the gas-entry pressure of the next smaller pore size, and the ozone gas will only flow through the larger pore network. If, however, the combined capacity of the largest pores is insufficient to conduct all of the injected gas, the applied pressure will rise until it exceeds the gas-entry pressure of the next smaller pore-size class. If the ozone flow can be accommodated by the combination of pore sizes at this point, the process of displacement of water from smaller pores will not continue. Otherwise, the injected gas will enter successively smaller pores until a dynamic equilibrium between the applied pressure and gas flow is achieved.

A significant, advantage of the ozone pulse system of the invention is the high gas injection flow rate which increases the movement of ozone gas from large pores into successively smaller pores. As the gas flow rate is increased, the number of smaller pores that become gas-filled also increases. This phenomenon continues until the injection pressure and flow come into equilibrium with the capacity of the soil matrix to accept flow. Using the pulse system, the substantially higher gas injection flow rates (1 to 20 CFM) compared to the conventional methods (0.5 to 2 CFM), the ozone pulse technology is capable of forcing ozone into smaller pore-size classes, thus enhancing the contact between ozone and the contaminants.

The Pilot Study

A pilot study was conducted at a test site using the ozone pulse system to determine the effect the injection pressure and flow rate have on the zone of influence and to evaluate the mass transfer efficiency as a function of the injected ozone gas concentration. Groundwater at the site was encountered at depths ranging from 16 to 20 feet below ground surface (bgs). Soils at the site consisted primarily of fine sand and silt with interbedded layers of medium sand and silt.

For the pilot study, one ozone injection point was installed to a total depth of 35 feet bgs using conventional hollow stem auger drilling methods. The injection point was constructed of ½-inch stainless steel tubing with a 1-foot ozone-resistant screen on the bottom. The annular space around the well screen was filled with a No. 1 Morie well gravel to an elevation approximately 1 foot above the top of the well screen. A 1-foot bentonite seal was placed above the sand pack. The remaining annular space was grouted to the ground surface using a combination of Portland cement and bentonite. The ozone pulse system was connected to the injection well using ½-inch diameter Teflon tubing. Connections at the injection wells were made using stainless steel compression fittings.

The pilot study was conducted in two phases. During the first half of the test, concentrated ozone gas was injected into the ozone injection well, and the ozone gas flow rate was increased in a step-like manner. The flow rates ranged from 0.5 standard cubic feet per minute (SCFM) to a maximum of 10 SCFM, and the ozone gas concentration was kept constant at 5%. Throughout the pilot test, the gas pressure, flow rate, temperature, and ozone gas concentration were measured. During the second phase of the pilot study, the ozone gas concentration was increased in a step-like manner while the injection flow rate was held constant at 5 SCFM. The ozone concentrations were increased from 1% to a maximum of 10% in four steps. At discrete intervals during each phase of the study, the depth to water, dissolved oxygen, dissolved ozone, pH, and ORP concentrations were measured in the monitoring points. Gas phase ozone concentrations were measured using a 254 nm UV Photometer. Concentrations of dissolved ozone were measured using the Indigo method. A summary of the pilot study data is presented in Table 2.

TABLE 2

Pilot Study Results
Step Flow Test

| Flow Rate (SCFM) | Zone of Influence (feet) | Injection Pressure (psig) |
|---|---|---|
| 0.5 | 3 | 9.6 |
| 5 | 8 | 11.6 |
| 10 | 15 | 17.1 |

Referring to Table 2, at an ozone injection rate of 0.5 SCFM the approximate zone of influence was determined to be 3 feet. As the flow rate was increased to 5 SCFM, the zone of influence increased to 8 feet, and at the highest gas injection rate of 10 SCFM the zone of influence was 15 feet. As expected, the injection pressure increased as the flow rate was increased due to the greater frictional losses in the ½-inch tubing and the ½-inch injection wells. However, the observed pressure increase was greater than the additional frictional losses alone. The higher pressure is due, in part, to the greater resistance to flow from the smaller pores through which the gas was flowing as the capacity of the larger pores to accept flow was exceeded. This increase in the gas-entry pressure indicates that at higher flow rates the ozone was forced into the smaller pores associated with the fine sand and the silt rather than flowing preferentially through the larger pores of the medium sand. At the maximum flow rate of 10 SCFM, the observed gas-entry pressure was greatest, indicating that the injected gas was flowing through both the fine- and coarse-grained material pore spaces.

Referring to Table 3, as the concentration of the ozone gas was increased, the dissolved ozone concentration also increased. The observed dissolved ozone concentrations were less than the calculated saturation concentrations due to ozone depleting processes such as natural oxidant demand and reactions with the contaminants of concern.

TABLE 3

Pilot Study Results
Ozone Concentration Evaluation

| Ozone Gas Concentration (%) | Dissolved Ozone Concentration (mg/L) |
|---|---|
| 1% | ND |
| 5% | 0.2 |
| 8% | 0.8 |
| 10% | 2.0 |

The ozone pulse technology was implemented at a hazardous waste site in New York state for a long-term pilot study. The depth to water at the site ranged from 15 to 20 feet bgs. Soils consisted primarily of fine to medium sand. The contaminants of concern were petroleum hydrocarbons associated with a fuel release. Eight ozone injection points were installed to a total depth of 30 feet bgs. Injection points were constructed of 2-inch diameter PVC with 29 feet of solid casing and a 1 foot 0.010 slot PVC well screen.

Prior to the start of the ozone pulse system, the minimum injection pressure was determined by calculating the hydrostatic pressure, the gas-entry pressure, and friction losses for each injection well and adding a safety of factor. The maximum pressure was determined by calculating the volume of gas required to achieve a 10 foot zone of influence for each injection point based on the gas pressure necessary to fill the ozone pulse tank with the minimum volume of ozone. These calculated values were programmed into the PLC and then verified during the start-up of the ozone pulse system. Table 4 is a summary of the pulse tank cycle data.

TABLE 4

Pulse Tank Cycle Summary

| Active Injection Point | Fill Time (min.) | Discharge Time (sec.) | Min. Tank Pressure (psig) | Max. Tank Pressure (psig) | Average Flow Rate (CFM) |
|---|---|---|---|---|---|
| AS-1 | 55 | 88 | 18 | 42 | 7.4 |
| AS-2 | 55 | 42 | 18 | 42 | 15.6 |
| AS-3 | 55 | 46 | 18 | 42 | 14.2 |
| AS-4 | 55 | 30 | 18 | 42 | 21.8 |
| AS-5 | 55 | 103 | 18 | 42 | 8.1 |
| AS-6 | 55 | 63 | 18 | 42 | 10.4 |
| AS-7 | 55 | 87 | 18 | 42 | 7.4 |
| AS-8 | 55 | 37 | 18 | 42 | 17.9 |

Referring to Table 4, the pulse tank was operated at minimum and maximum pressures of 18 and 42 psig, respectively. The average ozone injection flow rate varied from a low of 7.4 CFM to a maximum of 21.8 CFM. Friction losses in conveyance piping and hydrostatic pressures were essentially the same for each injection point; the variability in flow rates for each injection well was due primarily to the soil permeability. The average ozone gas concentration throughout the test was 7%. During the pilot study, the average concentration of hydrocarbons in groundwater was reduced from 1.120 mg/L to below the method detection limit.

While the invention has been described in connection with preferred embodiments, the description is not intended to limit the scope of the invention to the particular forms set forth, but on the contrary, it is intended to cover such alternatives, modifications, and equivalents as may be included within the spirit and scope of the invention as indicated by the language of the appended claims.

REFERENCES

ESTCP Cost and Performance Report (CU-9808), Multi-Site In Situ Air Sparging, Environmental Security Technology Certification Program, U.S. Department of Defense, December 2000.

Johnson, P. C., A. Das, and C. L. Bruce. 1999. Effect of Flow Rate Changes and Pulsing on the Treatment of Source Zones by In Situ Air Sparging. Environmental Science and Technology. 33 (10): 1726-1731.

U.S. Environmental Protection Agency. 1992. A Technology Assessment of Soil Vapor Extraction and Air Sparging. EPA/600/R-192/173. September.

Baker, R. S., Pemmireddy, R., McKay, D. 1996. Evaluation of Air-Entry Pressure During In-Situ Air Sparging: A Potentially Rapid Method of Feasibility Assessment. Proceedings of the $1^{st}$ International Symposium on In Situ Air Sparging for Site Remediation. Oct. 24 & 25, 1996, Las Vegas, Nev. INET, Potomac, Md.

Waller, Ing. Franz, and C. Vincent Ciufia, Ozone Measurement by UV Photometry, International Ozone Associate $16^{th}$ World Congress, Aug. 31-Sep. 5, 2003.

U.S. Army Corps of Engineers, EM 1110-1-4005, Engineering and Design In-Situ Air Sparging, 1997.

I claim:

1. A sparging apparatus for treating contaminates within a contaminated sub-surface comprising:
    (a) an injection point injector for injecting ozone into one or more injection points within said contaminated sub-surface;
    (b) a high pressure ozone source for providing a high pressure ozone gas mixture that comprises an oxygen carrier gas having an ozone gas concentration of about 5 percent or greater by weight of ozone gas;
    (c) a high-pressure pulse storage tank coupled to said high pressure ozone source for temporarily storing said ozone gas mixture, produced by said high pressure ozone source;
    (d) a valve coupled between said high-pressure pulse storage tank and said injection point;
    (e) a controller for causing said valve to open and transport said ozone gas mixture within said high pressure pulse storage tank into said injection point injector when pressure of said ozone gas mixture in said high-pressure pulse storage tank reaches a high discharge pressure site-specific set-point, and for causing said valve to be closed when pressure within said high pressure pulse storage tank decreases to a minimum injection pressure needed to induce gas flow.

2. The apparatus of claim 1 wherein said high pressure site-specific set-point is set between 40 and 75 psig and a low pressure site specific set-point is set between 15 and 40 psig.

3. The apparatus of claim 1 wherein said high pressure site-specific set-point is set as high as 100 psig and said low pressure site specific set-point is set as high as 50 psig with less permeable soil conditions and/or when said injection points are positioned significantly below a water table.

4. The apparatus of claim 1 wherein said high pressure site-specific set-point is set between 80 and 100 psig.

5. The apparatus of claim 3 wherein said high pressure site-specific set-point is set between 80 and 100 psig.

6. The apparatus of claim 1 wherein said ozone gas mixture has an ozone concentration of 10-14% by weight of ozone gas.

7. The apparatus of claim 2 wherein said ozone gas mixture has an ozone concentration of 10-14% by weight of ozone gas.

8. The apparatus of claim 3 wherein said ozone gas mixture has an ozone concentration of 10-14% by weight of ozone gas.

9. The apparatus of claim 4 wherein said ozone gas mixture has an ozone concentration of 10-14% by weight of ozone gas.

10. The apparatus of claim 5 wherein said ozone gas mixture has an ozone concentration of 10-14% by weight of ozone gas.

11. The apparatus of claim 1 wherein the ozone gas concentration is about 7% and the maximum tank pressure is about 40 psig.

12. A sparging apparatus for treating a contaminated sub-surface comprising:
 (a) an injection point injector for injecting ozone into one or more injection points within said contaminated sub-surface;
 (b) a high pressure ozone source for providing a high pressure ozone gas mixture that comprises an oxygen carrier gas having an ozone gas concentration of about 5 percent or greater by weight of ozone gas;
 (c) a high-pressure pulse storage tank coupled to said high pressure ozone source for temporarily storing said ozone gas mixture, produced by said high pressure ozone source, at maximum tank pressures up to about 100 psig or more;
 (d) a controller for causing a valve to couple said pulse storage tank to an injection point of said injection point injector when injection pressure within said tank reaches a high pressure discharge site-specific set-point for producing an ozone gas pulse, and for thereafter decoupling said pulse storage tank from said injection point when said injection pressure and back pressure from said sub-surface come into equilibrium.

13. Apparatus of claim 12 wherein after said controller produces decoupling in accordance with (d), said pulse storage tank is again coupled to said high pressure ozone source for causing the storage tank to be re-pressurized to enable production of a subsequent ozone gas pulse.

14. The apparatus of claim 13 wherein said controller couples and decouples said pulse storage tank to and from a second injection point in accordance with paragraph (d), and so forth for subsequent injection points if provided.

15. The apparatus of claim 12 wherein oxygen carrier gas has an ozone gas concentration of 10-14% by weight of ozone gas.

16. The apparatus of claim 13 wherein oxygen carrier gas has an ozone gas concentration of 10-14% by weight of ozone gas.

17. The apparatus of claim 14 wherein oxygen carrier gas has an ozone gas concentration of 10-14% by weight of ozone gas.

18. A sparging apparatus for treating a contaminated sub-surface comprising:
 (a) an injector for injecting ozone into one or more injection points within said contaminated sub-surface;
 (b) a high pressure ozone source for providing a high pressure ozone gas mixture having an ozone gas concentration of about 5 percent or greater by weight of ozone gas;
 (c) a high-pressure pulse storage tank coupled to said high pressure ozone source for temporarily storing said ozone gas mixture, produced by said high pressure ozone source, at maximum tank pressures up to about 100 psig or more; and
 (d) a controller for causing a valve to
 (d-1) couple said high pressure pulse storage tank to an injection point of said injection when injection pressure within said tank reaches a high pressure sight-specific set-point, and for
 (d-2) thereafter decoupling said high pressure pulse storage tank from said injector for causing groundwater to flow back into sub-surface channels that had been filled with ozone gas, creating mechanical mixing between groundwater and injected ozone thus enhancing contact between oxidizer and contaminants.

19. The apparatus of claim 18 wherein oxygen carrier gas has an ozone gas concentration of 10-14% by weight of ozone gas.

20. The apparatus of claim 19 wherein said high pressure site-specific set-point is set between 40 and 75 psig.

* * * * *